(12) United States Patent
Candy

(10) Patent No.: US 12,429,620 B2
(45) Date of Patent: Sep. 30, 2025

(54) MAGNETIC FIELD ANTENNA OF A METAL DETECTOR

(71) Applicant: Minelab Electronics Pty. Limited, Mawson Lakes (AU)

(72) Inventor: Bruce Halcro Candy, Mawson Lakes (AU)

(73) Assignee: Minelab Electronics Pty. Limited, Mawson Lakes (AU)

( * ) Notice: Subject to any disclaimer, the term of this patent is extended or adjusted under 35 U.S.C. 154(b) by 302 days.

(21) Appl. No.: 18/266,962

(22) PCT Filed: Dec. 15, 2021

(86) PCT No.: PCT/AU2021/051493
§ 371 (c)(1),
(2) Date: Jun. 13, 2023

(87) PCT Pub. No.: WO2022/126185
PCT Pub. Date: Jun. 23, 2022

(65) Prior Publication Data
US 2024/0118447 A1    Apr. 11, 2024

(30) Foreign Application Priority Data
Dec. 14, 2020  (AU) ................................ 2020904645

(51) Int. Cl.
*G01V 3/10* (2006.01)
*H01F 38/14* (2006.01)

(52) U.S. Cl.
CPC ............. *G01V 3/107* (2013.01); *H01F 38/14* (2013.01); *H01F 2038/143* (2013.01)

(58) Field of Classification Search
CPC ........ G01V 3/107; G01V 3/104; H01F 38/14; H01F 2038/143; H01F 27/28; G01R 33/1253; H02K 3/04
See application file for complete search history.

(56) References Cited

U.S. PATENT DOCUMENTS

| 8,106,770 B2 | 1/2012 | Candy |
| 9,989,663 B1 | 6/2018 | Earle |

(Continued)

FOREIGN PATENT DOCUMENTS

WO    2018126808 A1    7/2018

OTHER PUBLICATIONS

Dunlop et al., "Rock Magnetism, Fundamentals and Frontiers, Chapter I: Magnetism in nature", 1997, pp. 1-15, Cambridge University Press.

(Continued)

*Primary Examiner* — Seung H Lee
(74) *Attorney, Agent, or Firm* — The Webb Law Firm

(57) ABSTRACT

A hand-held metal detector coil, including a coil housing which houses aggregate transmit windings and aggregate receive windings. The aggregate transmit windings include a major group of transmit windings that includes a first transmit winding, and the aggregate receive windings include a major group of receive windings that includes a first receive winding; the coil further includes a minor group of windings to null the aggregate receive windings with respect to the aggregate transmit windings. In an absence of external influences, a mutual inductance coupling coefficient between the aggregate receive windings and the aggregate transmit windings, $k_{TR}$, is <0.03. A mean location of turns of the major group of transmit windings is further from a bottom plane of the coil housing than a mean location of turns of the major group of receive windings; the first transmit winding has at least part of their cross-sectional winding profile with a first cross-sectional axis longer than a second cross-sectional axis by at least a factor of 3; a mutual coupling constant coefficient between the major group of transmit windings and the major group of receive windings, $k_{11}$, is <0.5; and a mean location of turns of the of (Continued)

the first transmit winding is at least 25 mm or more from a bottom plane of the coil housing.

15 Claims, 5 Drawing Sheets

(56) References Cited

U.S. PATENT DOCUMENTS

| | | | |
|---|---|---|---|
| 11,658,416 B2* | 5/2023 | Candy | G01V 3/165 |
| | | | 343/702 |
| 11,879,326 B2* | 1/2024 | Werkheiser | G01V 3/10 |
| 2011/0234214 A1* | 9/2011 | Jones | G01V 3/107 |
| | | | 324/239 |

OTHER PUBLICATIONS

Fu et al., "Compensation of Cross Coupling in Multiple-Receiver Wireless Power Transfer Systems", IEEE Transactions on Industrial Informatics, 2016, 9 pages, vol. 12:2.

Kaufman et al., "Frequency and Transient Soundings, Chapter 3: Time-Domain Electromagnetic Fields Generated By a Magnetic or Electric Dipole Source on a Stratified Medium", 1983, pp. 315-410, Elsevier, Amsterdam.

Pratik et al., "Optimum Design of Decoupled Concentric Coils for Operation in Double-Receiver Wireless Power Transfer Systems", IEEE Journal of Emerging and Selected Topics in Power Electronics, 2019, 16 pages, vol. 7:3.

* cited by examiner

MAGNETIC FIELD ANTENNA OF A METAL DETECTOR

CROSS REFERENCE TO RELATED APPLICATIONS

This application is the United States national phase of International Patent Application No. PCT/AU2021/051493 filed Dec. 15, 2021 and claims priority to Australian Patent Application No. 2020904645 filed Dec. 14, 2020, the disclosures of which are hereby incorporated by reference in their entireties.

BACKGROUND OF THE INVENTION

Field of the Invention

The present disclosure relates to a magnetic field antenna of a metal detector.

Description of Related Art

A typical metal detector comprises a magnetic antenna which comprises a magnetic field transmitter and a magnetic field receiver, to transmit a transmitted magnetic field and to receive a received magnetic field, respectively. Within the hand-held metal detector industry, magnetic antennae are known as "coils", and almost all comprise inductive coiled windings that act to transmit time-changing magnetic fields and to receive time-changing magnetic fields. These windings are typically housed within a coil housing, such as plastic coil housing. The magnetic field transmitter and the magnetic field receiver may be the same entity, for example they may be provided by a dual-purpose so called "monoloop" coil winding. Commercially available hand-held metal detector coils often have circular or elliptically shaped planar coil housings that are wide and long compared to their height. Normally, the coil is swept side-to-side with the planar coil housing constrained to be about parallel to the soil surface and just above the soil surface when buried targets are being sought by an operator, with the operator advancing slowly forward, usually ensuring that coil housing at least passes over all the soil being interrogated along the "pathway" being defined by the swept width of the gradual forward passage of the operator. The windings are often surrounded by an electrostatic (ES) screen within the coil housing, with the ES screen connected to a "ground" reference potential of the detector electronics. This acts to screen out external EMI electric fields coupling into the receiver, and also variations in capacitive coupling between the transmit electric field and the soil permittivity and the magnetic field receiver, as the coil is swept over the soil.

Magnetic soils contain super-paramagnetic viscous remnant magnetic particles (called VRM) that are highly relevant to metal detectors, namely, single crystal ferrite particles with dimensions about the 30 nm range. Each particle has an associated time-constant that are Arrhenius temperature dependent. Basically, this time-constant determines how frequently the direction of the magnetism of the particle spontaneously randomly changes direction in the absence of an external magnetic field. (See for example see David J Dunlop and Ozden Ozdemir (1997), Rock Magnetism, Fundamentals and Frontiers, Cambridge: Cambridge University Press, Online ISBN: 9780511612794). The received signals from these VRM super-paramagnetic particles are a function of the history of the applied varying transmitted magnetic field, and are thus associated with energy loss, and are sometimes referred to as the "R" component. There are other more abundant non-VRM magnetic components comprising larger single domain crystals and multi-domain, and yet further, effectively non-VRM components from a metal detector point of view, that are actually VRM components, but have time constants well outside of the bandwidth of the metal detector receive electronics. These said non-VRM magnetic soil components (plus relatively very short or very long time constant VRM components) respond directly, effectively almost instantaneously, to the metal detectors transmitted applied magnetic field, rather than being a function of the history of the applied magnetic field, and therefore these particles are associated with energy conservation, and are sometimes referred to as the "X" component. However, if the transmitted magnetic field is significantly intense enough, some of these "X" components may exhibit Rayleigh hysteresis, and this in turn modifies the field non-linearly with transmitted field intensity within the soil applied to the VRM components, that is, this Rayleigh hysteresis thus modifies the transmitted functional form $\vec{H}$ within the soil matrix. Further, VRM particles exposed to the more intense transmitted magnetic field may experience intrinsic non-linear behaviour as a function of transmitted field, and yet further, magnetostriction present in some magnetic particles also may respond non-linearly. All of this non-linear behaviour results in a metal detector response to the soil known as "saturation" by the industry. Magnetostriction necessarily causes a response not directly instantaneously proportional to the applied transmitted field. This latter effect thus also adds to the VRM "R" component. The said non-VRM magnetic soil components, plus relatively very short or very long time constant VRM components, together have a relative magnetic permeability of typically roughly two orders of magnitude greater than the effective VRM components with time constants within the effective bandwidth of the metal detector. Received signals from these magnetic soil particles responding to the transmit field are relatively massive compared to the weakest detectable metal target eddy current induced signals, and thus the received soil signals need be cancelled out, whilst not cancelling out the metal target signals, in order to detect these said weakest detectable metal target signals. This technique of cancelling out magnetic soil signals is known as "ground balancing" in the industry. On average, soils exhibit approximately log-uniform time-constant VRM distributions in the time-constant range relevant to hand held metal detectors, but with a slight somewhat spatially random log-linear component (see for example, U.S. Pat. No. 8,106,770). Typically, the said saturation may be manifest in surface soils located within the more intense areas of the transmitted field, and this is typically not well cancelled out via ground balancing. This is often evident in some soils when some highly sensitive fit-for-purpose metal detectors designed for gold nugget prospecting are used. This saturation thus produces "spurious" signals and thus reduces the capability of locating the weakest detectable targets. The degree of saturation varies considerably depending on the soil. Soils in which saturation is evident sometimes are known as "saturable soils".

Most commercial metal detector coil windings are of a compact cross-sectional winding shape, typically circular or rectangular or square in cross-sectional shape. However, some coils of metal detectors designed fit-for-purpose to find gold in gold fields, have windings that are not compact in cross-sectional shape, but arranged in monolayer planar spirals with each of the adjacent turns usually touching one another. Most windings are usually housed close to the bottom of the planar coil housing and have their "2-D" winding plane close to parallel with the coil housing bottom plane. Coils incorporating spiral planar monolayer windings are usually known as "flat-wound" coils in the industry, but such windings are known scientifically as Archimedean spiral windings. They have two advantages for detecting small shallow targets compared to coils containing compact cross-sectional profile windings, owing to the following:

As the coil is swept past a shallow buried metal target, the more intense areas of the transmit field and receiving winding sensitivity from spiral windings are laterally broader, and hence yield an improved electronics signal-to-noise ratio; that is, the signal from the shallow target is within the effective volume of stronger transmitted stronger field for a longer period compared to that of a compact winding, and similarly the metal target is within the more sensitive areas of a spiral receive winding for a longer period than a compact receive winding.

As $LI^2 = \oiiint \vec{H} \cdot \vec{B} dV$, for a given inductance and a transmitted current, is by definition, the same for all coils regardless of winding shape, more of the strong transmitted field of traditional compactly wound bundle resides within or close to the perimeter of the actual bundled windings than does the field of the planar spiral winding. Hence the spiral flat-wound winding has the advantage of irradiating more of its field out into the environment than the compact traditional winding bundle, thus exploiting the spiral winding's field for better target detection.

For a flat-wound receive monolayer winding of given inductance and given mean winding diameter, the planar spiral wound receive winding has more turns than an "equivalent" bundled receive winding. Thus, the planar receive winding may have more "gain" owing to the effective higher number of receive winding turns.

However, flat-wound coils have two disadvantages, especially for detecting deeper targets compared to a compact winding:

The greater integrated field energy transmitted into the surface soils causes greater saturation than bunched windings in soils, thus generating greater detectable un-ground-balanced signals, in soils prone to saturation. This is most overt when the transmitted field intensity is highest in the soil, typically being most manifest when the bottom plane of the coil is moved within a centimetre or two of the soil surface.

The spiral windings are more sensitive to local surface soil VRM inhomogeneities, and this too causes noticeably more spurious signals.

Thus in general, the advantages of spiral windings outweigh the disadvantages when prospecting in magnetic soils that have relatively low "saturation" magnetic mineralization for detecting shallow targets, but vice-versa in soils that have relatively high saturable mineralization, and indeed the latter may result in relatively poor detector performance in some soils when seeking deeply buried targets.

Magnetic EMI sources that interfere with metal detectors are usually much further away from metal detector coils compared to the width of the said metal detector coil. Thus, typically the said EMI magnetic field intersecting the said metal detector coil is close to being uniform. Hence, the requirement to "null out" induced emf from far field magnetic EMI sources in the receive windings is $$\sum_{\text{all receive windings}} \oiint \frac{\partial \vec{B}_{\text{uniform field}}}{\partial t} \cdot d\vec{s} = 0,$$

where $\vec{B}$ is the effectively uniform changing EMI magnetic field intersecting the coil receive windings.

There are two different requirements for metal detector coils: coils designed for maximum detection distance (target buried "depth" in soils), and coils designed for cancelling external magnetic EMI, also known as "Noise Cancelling" coils or "NC" coils in the industry. This disclosure covers both types of coil. An example of a commercial NC coil, is one with a coplanar receive winding with a symmetric "Figure-8" shape with one half orientated "out-of-phase" with the other, so that the induced EMI signal emf in one half exactly cancels that in the other half for a spatially uniform time varying magnetic field. Another source of problematic soil signals that are typically poorly "ground balanced" is from conductive soils. As this source is most manifest as being relatively "deep", at least for several microseconds and longer following transmit signal transitions, this source too is substantially cancelled by NC coils. The physics of soil conductivity is, for example, described by Alexander A. Kaufman and George V. Keller (1983). Chapter 3. In Frequency and Transient Soundings. Amsterdam: Elsevier. However, for a given size, NC coils will not detect as deeply buried metal targets as coils designed for maximum detection range, because, NC coils intrinsically necessarily cancel out "far fields", and the eddy current magnetic fields generated by metal targets due to the varying transmitted field that are buried at depths greater than say the mean width of the coil, present as quasi-uniform fields at the coil.

This disclosure relates in particular to so called "nulled coils" with separate transmit and receive windings, and not for example, to "mono-loop" coils. There are various well-known types of nulled coils, for example the so called "DD", "DOD" and concentric types. Nulled coils have a receive winding arrangement such that $$\sum_{\text{all receive windings}} \oiint \frac{\partial \vec{B}_{Tx}}{\partial t} \cdot d\vec{s} \approx 0,$$

that is, the emf induced from net integrated transmitted magnetic field encompassed through the aggregate receive windings approximately equals zero. In other words, the net mutual coupling coefficient "k" between the aggregate transmit windings and aggregate receive windings is $k_{TR} \ll 1$, and in commercial coils, certainly $k_{TR} < 0.03$, and typically closer to the order of 0.001. This may be achieved by having a partial overlap between a single transmit winding and a single receive winding, as is the case with the well-known DD coils. Alternatively, so called "concentric coils" employ a plurality of receive winding in series, and/or, a plurality of transmit windings in series, such that the aggregate induced emf in all the receive windings from all the transmit winding fields is approximately zero. Hitherto commercial hand-held detector coils house windings which typically are near coplanar, as is the case for most concentric coils; or near to being coplanar, as is the case with DD coils or DOD coils; and the windings are all relatively close to a bottom plane of the coil housing, so that the windings are designed to couple well into the surface soils when the bottom plane of the coil housing is near the soil surface when prospecting for buried metal targets.

If the said two main causes of spurious soil signals described above, namely, saturation and sensitivity to surface soil VRM inhomogeneities, are in effect defined as "uncancelled soil noise signal", then a metal-target-signalto-uncancelled-soil-noise-signal ratio, plus the relative sensitivity to targets relatively far from the coil, may define the relative capability of coils, for a given coil housing area and shape as viewed from above, and also given whether the coil is a NC coil or not. In addition, a coil's sensitivity to shallow buried targets is also a factor.

This disclosure relates to transmit field nulled concentric coils for hand held metal detectors for locating targets buried within soils. Thus, coils such as DD or DOD windings are excluded from this disclosure. However, there is no requirement herein that the windings be symmetric as may be implied by the name "concentric". It provides an alternative form of winding shapes and orientations within a metal detector coil that have reduced level of some of the disadvantages of existing coils.

SUMMARY OF THE INVENTION

According to an aspect of the present disclosure, there is provided a hand-held metal detector coil, comprising a coil housing which houses aggregate transmit windings and aggregate receive windings; wherein the aggregate transmit windings comprise a major group of transmit windings that comprises a first transmit winding, and the aggregate receive windings comprise a major group of receive windings that comprises a first receive winding; the coil further comprises a minor group of windings to null the aggregate receive windings with respect to the aggregate transmit windings, wherein in an absence of external influences, a mutual inductance coupling coefficient between the aggregate receive windings and the aggregate transmit windings, $k_{TR}$, is <0.03; and wherein a mean location of turns of the major group of transmit windings is further from a bottom plane of the coil housing than a mean location of turns of the major group of receive windings; the first transmit winding has at least part of their cross-sectional winding profile with a first cross-sectional axis longer than a second cross-sectional axis by at least a factor of 3; a mutual coupling constant coefficient between the major group of transmit windings and the major group of receive windings, $k_{11}$, is <0.5; and a mean location of turns of the of the first transmit winding is at least 25 mm or more from a bottom plane of the coil housing.

In one form, the aggregate receive windings comprises a minor group of receive windings that comprises a second receive winding; and wherein the major group of receive windings and the minor group of receive windings are connected out-of-phase relative to each other; and a mutual coupling constant coefficient between the major group of transmit windings and the minor group of receive windings, $k_{12}$, is >0.4, and a mutual coupling coefficient between the major group of transmit windings and the minor group of receive windings, $k_{12}$, is greater than a mutual coupling coefficient between the major group of transmit windings and major group of receive windings, $k_{11}$; and an inductance of the major group of receive windings is greater than an inductance of the minor group of receive windings; and a mean location of turns of the minor group of receive windings is further from the bottom plane of the coil housing than the mean location of turns of the major group of receive windings.

In one form, the aggregate transmit windings comprises the minor group as a minor group of transmit windings, that comprises a second transmit winding; and wherein the major group of transmit windings and the minor group of transmit windings are connected out-of-phase relative to reach other; a mutual coupling constant coefficient between the major group of receive windings and the minor group of transmit windings, $k_{21}$, is >0.4, and a mutual coupling coefficient between the major group of transmit windings and the major group of receive windings, $k_{11}$, is less than a mutual coupling coefficient between the minor group of transmit windings and the major group of receive windings, $k_{21}$; and an inductance of the major group of transmit windings is greater than an inductance of the minor group of transmit windings; and a mean location of turns of both the minor group of transmit windings and the major group of transmit windings are each further from the bottom plane of the coil housing than the mean location of turns of the major group of receive windings.

In one form, the first receive winding has at least part of its cross-sectional winding profile with a third cross-sectional axis longer than a fourth cross-sectional axis by at least a factor of 3.

In one form, a mean location of turns of the minor group of receive windings is further from the bottom plane of the coil housing than the mean location of turns of the aggregate transmit windings, and both a mean path of turns of the aggregate transmit windings and a mean path of turns of the minor group of receive windings are each closer to an outer perimeter of the coil housing than a mean path of turns of the major group of receive windings.

In one form, both the mean path of turns of the aggregate transmit windings and the mean path of turns of the minor group of receive windings are each closer to an outer perimeter of the coil housing than the mean path of turns of the major group of receive windings by a factor of more than 1.3 times.

In one form, the third cross-sectional axis of the first receive winding is on average more parallel than perpendicular to a bottom plane of the coil housing.

In one form, the aggregate receive windings null out a changing uniform magnetic field as follows:

$$\sum\nolimits_{all\ receive\ windings} \oiint \frac{\partial \overrightarrow{B_{uniform\ field}}}{\partial t} \cdot d\vec{s} \approx 0.$$

In one form, the first cross-sectional axis of the first transmit winding is on average more perpendicular than parallel to a bottom plane of the coil housing.

In one form, the aggregate transmit windings comprises at least two transmit windings, the first transmit winding, and a fourth transmit winding, wherein the first transmit winding and the fourth transmit winding are connected in series with the same sign sense.

In one form, the fourth transmit winding has at least part of its cross-sectional winding profile with a fifth cross-sectional axis longer than a sixth cross-sectional axis by at least a factor of 3.

In one form, at least part of the major group of transmit windings comprises at least the first transmit winding and a fifth transmit winding, wherein the first transmit winding and a fifth transmit winding geometrically partial overlap, wherein the at least partial overlap has a displacement between some windings of the first transmit winding and some windings of the fifth transmit winding, wherein the displacement is relatively parallel to the bottom plane of the coil housing, wherein the first transmit winding and the fifth transmit winding are connected in series with the same sign sense.

In one form, the first receive winding has at least a first section with the third cross-sectional axis more parallel than perpendicular to the bottom plane of the coil housing on a side of the first receive winding that is relatively on the same side as at least one of the sides of the coil housing, and, the first receive winding has at least a second section with the third cross-sectional axis more perpendicular than parallel to the bottom plane of the coil housing on a side of the first receive winding that is relatively on the same side as at least one of a front or a rear of the coil housing, the said sides of the coil housing being perpendicular to the intended operational side-to side sweeping over the soil, and the said front of the coil housing being the leading edge of the intended operational gradual forward movement, and the said rear of the coil housing being the trailing edge of the intended operational gradual forward movement.

In one form, the transmit aggregate windings and the second receive winding has a mutual inductance coupling coefficient $k_{T2}>0.7$, and the aggregate transmit windings has a mean path of turns with a longer perimeter than a mean path of turns of the minor group of receive windings, and the major group of receive windings has a mean path of turns with a longer perimeter than a mean path of turns the aggregate transmit windings, and the mutual inductance coupling coefficient between the major group of receive windings and the aggregate transmit windings $k_{T1}<0.5$, and the first receive winding has at least part of its cross-sectional winding profile with a third cross-sectional axis longer than a fourth cross-sectional axis by at least a factor of 3, with the third cross-sectional axis on average being more perpendicular than parallel to a bottom plane of the coil housing than the fourth axis.

In one form, the major group of receive windings has a mean path of turns with a longer perimeter than the mean path of turns the aggregate transmit windings by more than a factor of 1.3 times.

In one form, the aggregate transmit windings has a mean path of turns with a longer perimeter than a mean path of turns of the aggregate receive windings, and the aggregate receive windings has a mean path of turns with a longer perimeter that the minor group of transmit windings, and the mutual inductance coupling coefficient between the aggregate receive windings and the minor group of transmit windings is $k_{2R}>0.7$, and the mutual inductance coupling coefficient between the major group of receive windings and the major group of transmit windings $k_{11}<0.5$.

In one form, the aggregate transmit windings comprises a third transmit winding, and the aggregate transmit windings has a mean path of turns with a longer perimeter than the major group of receive windings, and the third transmit winding has a mean location with a longer perimeter than the minor group of receive windings, and the mutual inductance coupling coefficient between the minor group of receive windings and the third transmit winding $k_{32}>0.7$, and a mean location of turns of the minor group of receive windings is further from the bottom plane than the mean location of turns of the aggregate transmit windings, and a mean location of turns of the third transmit winding is further from the bottom plane than the mean location of turns of the aggregate transmit windings, and the third transmit winding is in series with the first transmit winding with the same sign sense.

In one form, the aggregate transmit windings has a mean path of turns with a longer perimeter than a mean path of turns of the aggregate receive windings by a factor of more than 1.3 times.

In one form, the hand-held metal detector coil is with at least one partial electrostatic screen, a first partial electrostatic screen within the coil housing, that is electrically connected to the receive electronics via a first cable, acts to screen at least some of the aggregate receive windings from some external electrical fields, wherein a capacitance between the first partial electrostatic screen and aggregate receive windings is higher than a capacitance between the first partial electrostatic screen and the aggregate transmit windings, and, wherein a second partial electrostatic screen within the coil housing that acts to screen at least some of the transmit windings, has more capacitive coupling to the aggregate transmit windings than the aggregate receive windings, and is connected to the metal detector electronics via a second cable, wherein the first cable and second cable are different cables.

In one form, the major group of receive windings comprises a first receive winding in series with a third receive winding, such that a mean path of turns of the first receive winding is longer than a mean path of turns of the aggregate transmit windings by at least a factor of 1.25 times, and a mean path of turns of the aggregate transmit windings is longer than a mean path of turns of the third receive winding by at least a factor of 1.25 times, and a mutual coupling coefficient between the aggregate transmit windings and each of the first receive winding and the third receive winding is $k<0.5$, and a mutual coupling coefficient between the aggregate transmit windings and the minor group of receive windings is greater than a mutual coupling coefficient between the aggregate transmit windings and the major group of receive windings, and a mean location of turns of the third receive winding is closer to the bottom plane of the coil housing than a mean location of turns of the aggregate transmit windings, and a mean location of turns of the third receive winding is closer to the bottom plane of the coil housing than the mean location of turns of the minor group of receive windings.

DESCRIPTION OF THE INVENTION

Figure 1:
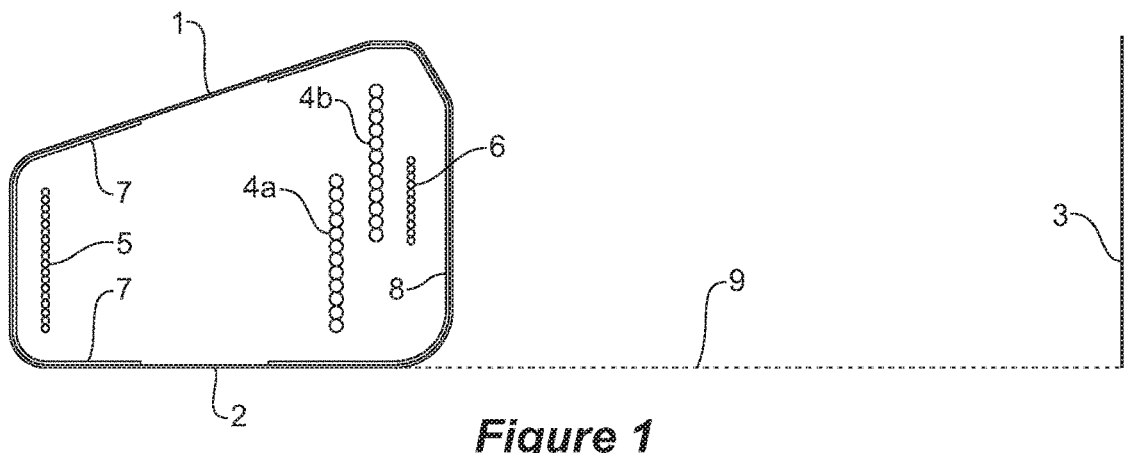
FIG. 1 shows an exemplary cross-section of a symmetrical circular coil of an embodiment of the disclosure.

One or more embodiments of this specification apply to coils with at least three windings, or more generally, at least three categorizable groups of windings, namely, a major group of transmit windings, and a major group of receive windings, and a minor group of windings which comprise at least a minor group of receive windings, and/or, at least a minor group of transmit windings. At least a first transmit winding resides within a major group of transmit windings, and, at least a first receive winding resides within a major group of receive windings, such that the major group of transmit windings and the major group of receive windings have a mutual inductance coupling coefficient $0.6 > k_{11} > 0.2$. The minor group of transmit windings, comprising at least a second transmit winding, are effectively connected in an out-of-phase sense with the major group of transmit windings. The minor group of receive windings, comprising at least a second receive winding, are effectively connected in an out-of-phase sense with the major group of receive windings. The effective coupling coefficient between the minor group of transmit windings and major group of receive windings and is $k_{21} > 0.4$, and greater than that between the major group of transmit windings and major group of receive windings ($k_{11}$), whichever is the greater, or, the effective coupling coefficient between the major group of transmit windings and minor group of receive windings is $k_{12} > 0.4$, and greater than that between the major group of transmit windings and major group of receive windings ($k_{11}$) whichever is the greater.

The "aggregate transmit windings" comprise all the transmit windings, both the major group of transmit windings and the minor group of transmit windings, and the "aggregate receive windings" comprise all of the receive windings, both the major group of receive windings and the minor group of receive windings. Most of the aggregate transmit windings' self-inductance resides in the major group of transmit windings, which exceeds that of the minor group of transmit windings by a factor at least of about 2, and, most of the aggregate receive windings' self-inductance resides in the major group of receive windings, which exceeds that of the minor group of receive windings by at least a factor of about 2. Most of the transmitted "intermediate distance" field (e.g. measured at a meter or so on axis from the aggregate transmit windings) is more due to the major group of transmit windings than the minor group of transmit windings. Similarly, most of the received induced emf in the aggregate receive windings from an "intermediate distance" on axis varying source field is more due to the major group of receive windings than the minor group of receive windings. From the perspective of the above conditions, a broad interpretation to aid understanding may be that the roles of the said minor groups of windings mostly are to facilitate a null between the aggregate transmit windings and aggregate receive windings, whereas, the major groups of windings mostly act to detect a target at relatively far distances. Note that the minor and major groups in concert act to reduce the sensitivity to relatively far targets owing to their effectively out-of-phase senses.

The aggregate windings may comprise just a single winding, or more than one winding, connected in series. However, the aggregate windings may not be actually connected together directly. For example, the aggregate receive windings may comprise a first receive winding and a second receive winding, wherein the first receive winding is connected to a first preamplifier and the second receive winding is connected to a second preamplifier, and outputs of the first preamplifier and second preamplifier may be combined, thus effectively creating an output signal from the aggregate receive windings comprising the induced emfs in both the first receive winding and the second receive winding. Similarly, the transmit electronics may comprise different transmitters connected to a first transmit winding and a second transmit winding, wherein the net field is an aggregate of the transmitted fields from both the first transmit winding and the second transmit winding. However, for the sake of simplicity to aid understanding, it may be easiest to think of all the individual receive windings connected in series to form the aggregate receive windings and similarly for the aggregate transmit windings.

In this specification, the singular and the plural forms of "winding" are "winding". However, the plural form can also be windings e.g. in reference to various types of windings or a group of windings.

In this specification, unless stated otherwise, the expression "mean path of turns" of a winding, means a trace along the path of the mean local location of the individual turns of the said winding, defined along the whole length of the winding. Thus, an example of a planar winding may be; a uniform bunched winding with a circular loop in overall shape, having a mean loop radius of 30 cm, and with a cross-sectional winding circular radius of 5 mm, with the said the compact winding cross-section being viewed in a plane parallel to the loop axis and passing through the loop axis. For this example winding thus, the mean path of turns of the winding may be a trace circle with a radius of 30 cm centrally located within the bunched winding turns. For the sake of simplicity, leads connecting each end of the winding to other parts of the coil and electronics are not considered part of a winding.

If a bottom plane of the coil housing is defined as $z=0$, and the turns of a winding are defined by $\langle x(t), y(t), z(t) \rangle$, x, y, $z \in \mathbb{R}3$, then the mean distance or "height" of all the turns of a winding above the bottom plane of the coil, may be defined as $$\text{mean height} = \frac{\int_0^\Phi z(t)\sqrt{x(t)^2 + y(t)^2}\, dt}{\int_0^\Phi \sqrt{x(t)^2 + y(t)^2}\, dt}$$

where t spans the (whole) length of (all) the turns of winding between $t=0$ to $\Phi$. In effect this is the mean of the "mean path of turns" of a winding, or a mean location of turns, and thus a point (e.g. $\langle x_1, y_1, z_1 \rangle$, unlike the "mean path of turns of a winding" that is a geometric trace, e.g. a loop $\langle x_1(t), y_1(t), z_1(t) \rangle$ )

An aspect of the improvement of an embodiment of the disclosure is reduced soil saturation signal. It is noted above that transmit "flat wound" windings are particularly prone to this problem owing to the transmit winding's transmitted magnetic field coupling well into the surface soil. However, bundled cross-sectional transmit windings certainly also generate saturation in saturable soils if they are housed close to a bottom plane of the coil housing, but less so than flat-wound windings. This is because bunched windings also have relatively high fields close to their windings, but less spread out than planar "flat wound" windings. It is possible to retain a degree of some of the said advantages of flat-wound windings, but largely mitigate the disadvantages of saturation of both flat-wound windings and also bundled windings, by:

a) Arranging the first transmit winding to have at least some of its winding cross-sectional shape of its turns density elongated with a first axis longer than a second axis perpendicular to the first axis, such that on average the first axis along the length of the first transmit winding is more perpendicular to a bottom plane of the coil housing than parallel to the bottom plane of the coil housing. For example, the first transmit winding may be arranged geometrically in an "opposite-sense" to the flat-wound winding arrangement, namely, a monolayer with its first axis being more perpendicular relative to the bottom plane of the coil instead of being parallel to it like the flat wound winding. For example, the transmit monolayer may have a "straight" cross-section (with no curvature for example), and the said cross-sectional winding plane may be set perpendicular ("vertical") to the bottom plane of the coil housing, rather than parallel ("horizontally") as is the case for the extant flat-wound windings that are at the bottom plane of the coil housing. That is, the transmit coil may be arranged to be a more "solenoid-like" helix than an Archimedean spiral. This alternative allows for the advantage of the major transmit winding still irradiating more of its transmit field out into the environment compared to a bundled winding, but with a reduction of the higher field volume coupled into near surface soils, and hence less VRM saturation. As the field of this "vertically orientated monolayer" transmit winding is less concentrated into the near surface soils compared to the horizontally orientated flat-wound and also a bundled winding, this arrangement also results in intrinsically less sensitivity to VRM variation of near surface soils, yet the (on axis) field relatively far from this vertically orientated monolayer transmit winding is similar, if not greater than that from a bunched winding owing to more turns for the same inductance and mean diameter of the said monolayer winding compared to a corresponding bunched winding.

b) Further, saturation and surface VRM inhomogeneities are accentuated when a significant proportion of turns of the receive windings are close to the transmit winding near to the soil surface because the said receive winding will be sensitive to saturation and near surface VRM inhomogeneities in this area. Thus, it is advantageous to reduce this occurrence compared to conventional nulled coils. This may be achieved by ensuring that when it is necessary to have part of a receive winding close to the transmit winding, for example, requiring a second receive winding within the minor group of receive windings to be close to the major group of transmit windings in order to attain good coupling between them, then at least part (or most) of the second receive winding still needs to be closely coupled to the transmit winding as required, but, in part or indeed largely, the individual turns of second receive winding are better designed to be relatively remote from the a bottom plane of the coil housing (thus not close to the soil when the coil is physically close to the soil surface) compared to the design of a conventional coil with the same requirement of a second winding being closely coupled to the transmit winding. Thus, a mean location of turns of the second receive winding may be designed to be further from the bottom plane of the coil housing than a mean location of turns of the first receive winding above the bottom plane of the coil housing.

c) Any receive winding that is not required to be designed near the transmit winding, is designed not to be close to the more intensely transmitted fields. For example, the mean path of turns of the of the minor group of receive windings may be designed to be closer to the mean path of turns of the major group of transmit windings, than the closest local mean path of turns of the first receive winding are to a local mean path of turns of the major group of transmit windings, and a mean path of turns of the second receive winding are closer to a mean path of turns of the major group of transmit windings, than a mean path of turns of the first receive winding are to a mean path of turns of the major group of transmit windings, by at least a factor of 3 times.

d) A mean location of turns of the major group of receive windings are closer to the bottom plane of coil housing than the aggregate transmit windings, in order to detect buried metal targets "beneath" the bottom plane as well as possible. Thus, a designed bottom plane of the coil housing may be thought of as being determined by the "lowest" part of major group of receive windings, for a typically well-designed coil exploiting the concepts described herein. The bottom plane may be defined as a plane coincident with the outer edge of, for example, a plastic coil housing adjacent the said "lowest" part of the major group of receive windings. Note that whilst the major group of receive windings are close to the bottom plane of the coil housing, and therefore close to the soil's surface when the bottom plane of the coil housing is close to the soil's surface, this will generate relatively low level spurious saturation signals (if any) compared to conventional concentric coil planar windings, for reasons given above, and also because the paths of turns of the major group of receive windings (their more sensitive areas) are not close to the more intense part of the transmitted field.

e) Like point a) above, the first transmit winding has a cross-sectional shape of its turns density elongated with a first axis longer than a second axis perpendicular to the first axis, but unlike point a) above, the first axis on average may be more parallel than vertically orientated to a bottom plane of the coil housing, and the mean location of turns of the first transmit coil does not reside relatively close to the bottom plane of the coil housing, and is at least 25 mm or more "above" the bottom plane of the coil housing. In contrast the mean location of the first receive winding may be much closer to the bottom plane of the coil housing. This ensures that the peak transmitted field within the soil when the bottom plane of the coil housing is close to the soil's surface is relatively weak compared to that a flat-wound transmit winding with a mean location of turns that is close to a bottom plane of the coil housing (for a given mean path of turns, winding inductance and transmitted current).

It may necessary to have leads connecting the first and second receive windings passing relatively closely to the more intense areas of transmit field, but the induced signal into such leads from any soil VRM saturation may be trivial. Indeed, such leads may pass over the top of the transmit winding thereby avoiding any significant coupling to the soil (albeit trivially small if passing between the transmit winding and soil).

FIG. 1 show an exemplary embodiment of the present disclosure, and this example shows a half cross-sectional view of a circular coil, symmetrical about a central axis 3, with the cross-sectional view passing through the central axis 3. (The full cross-section comprises a right-hand side mirror image about the axis of symmetry 3, and a bottom plane identical to bottom plane 2 lines-up with its geometric extension 9.) The shape of the coil viewed from below or above for example is thus symmetrically circular. Not shown is any mechanical connection to a metal detector shaft for simplicity, nor interconnecting leads. FIG. 1 shows a coil housing 1, with a bottom plane 2 of the coil housing 1. A cross-section of the aggregate transmit windings comprises only the major group of transmit windings; a group of two transmit windings 4a and 4b wherein for example 4b may be considered a first transmit winding. Transmit winding 4a and transmit winding 4b are connected in series in the same phase sense, with each winding having a turns density cross-sectional shape elongated with a ("vertical") first axis longer than a ("horizontal") second axis perpendicular to the first axis, with both transmit windings 4a and 4b being uniformly wound helical monolayers, with a "straight" winding cross-section, and each with their first axis orientated perpendicular to the bottom plane of the coil housing 2. The advantages of this orientation and relatively high "height-to-width" ratio of each of the cross-section of the said transmit windings 4a and 4b are given above. (Note: this cross-sectional shape perpendicular to the bottom plane 2 need not be at right-angles, and may be of many other shapes and angles, for example, have a cross-sectional shape comprising say a curve and be set with a mean angle of say 80 degrees to the bottom plane 2.)

A major group of receive windings, in this example, just a single winding, a first receive winding 5, shown as a monolayer winding, has a turns density cross-sectional shape elongated with a ("vertical") third axis longer than a ("horizontal") fourth axis perpendicular to the first axis, with the winding being a uniformly wound helical monolayer, with a "straight" winding cross-section, with its third axis orientated perpendicular to the bottom plane 2. This first receive winding also need not be perpendicular nor straight. This orientation reduces susceptibility to surface soil VMR inhomogeneity signals for reasons given above. On the central axis 3 side of the transmit windings 4a and 4b (the "inside"), is a minor group of receive windings, in this example just a single winding, a second receive winding 6, that may be thought of as a "nulling" winding. This second receive winding 6 is also shown as a helical monolayer and there is a relatively small gap between the second receive winding 6 and transmit windings 4a and 4b, and this second receive winding 6 is set "horizontally" opposite the overlapping parts of transmit windings 4a and 4b, where the magnetic field is relatively stronger. Thus, the mutual inductance coupling coefficient between the second receive winding 6 and aggregate transmit coil comprising transmit windings 4a and 4b is relatively high; at least about $k_{T2}=0.7$ or more. Note that the mean path of turns of the second receive winding 6 are closer to the mean path of turns of the aggregate transmit windings (4a and 4b), than the mean path of turns of the first receive winding 5 is to a local mean path of turns of the aggregate transmit windings (4a and 4b), by at least a factor of 3 times. The mean path of turns of the first receive winding 5 are on average closer to an outer perimeter of the coil housing than are either the mean path of turns of the aggregate transmit windings or the mean path of turns of the second receive winding 6. Because of these physical conditions, the mutual coupling constant between the aggregate transmit windings and first receive winding 5 is $k_{T1}<0.5$, thus being less than that between the aggregate transmit windings and second receive winding 6. The mean location of turns of the first receive winding 5, the major group of receive windings, is closer to a bottom plane of the coil housing than mean location of turns of the aggregate transmit windings (4a and 4b) are from the bottom plane of the coil housing.

The first receive winding 5 is connected in series with the second receive winding 6, in an out-of-phase sense to form a receive null with respect to the transmitted magnetic field, owing to the particular number of turns and locations of each of the four windings.

An ES screen 7 screens the first receive winding 5 from external EMI electric fields, and likewise an ES screen 8 screens the second receive winding 6 from external EMI electric fields. Both ES screen 7 and ES screen 8 are connected to the metal detector electronics. In most metal detectors, this is conventionally to the electronics reference "ground", but is may be connected to active electronics. Assuming the aggregate transmit windings (4a and 4b) are connected to a relatively low impedance with respect to the electronics reference "ground", these too act as a partial ES screen to both the first receive winding 5 and the second receive winding 6.

The advantages of these winding topologies are:
a) Low transmit field VRM saturation in surfaces soils owing to a mean location of turns of the aggregate transmit windings not being relatively close to a bottom plane of the coil housing;
b) Low sensitivity of the receive windings to surface soils close to the location where the transmit field may cause saturation, because the a mean path of turns of the major group of receive windings (the first receive winding 5), is relatively distant from this location, and a mean path of turns of the minor group of receive windings (second receive winding 6) is also relatively poorly coupled to this location;
c) Relatively low sensitivity of near surface VRM inhomogeneities, basically for the same reasons as given in point b.), and also, because the major group of receive windings, the first receive winding 5, has its third axis more perpendicular to the bottom plane 2 of the coil housing 1;
d) The monolayer transmit windings (4a and 4b in FIG. 1) transmitting more of their field away from the winding compared to the more traditional bunched windings; and
e) Similarly, the monolayer receive windings (5 and 6), effectively have more "gain" than the more traditional bunched windings.

Thus for FIG. 1, the aggregate transmit windings and the minor group of receive windings, the second receive winding 6, may have a mutual inductance coupling coefficient $k_{T2}>0.7$. The aggregate transmit windings have a mean path of turns with a longer perimeter than the mean path of turns of the of the minor receive windings, and the major receive windings has a mean path of turns with a longer perimeter than the mean path of turns the aggregate transmit windings, and the mutual inductance coupling coefficient between the major group of receive windings and the aggregate transmit windings $k_{T1}<0.5$, and the first receive winding has at least part of its cross-sectional winding profile with a third cross-sectional axis longer than a fourth cross-sectional axis by at least a factor of 3, with the third cross-sectional axis on average being more perpendicular than parallel to a bottom plane of the coil housing than the fourth axis.

Figure 2:
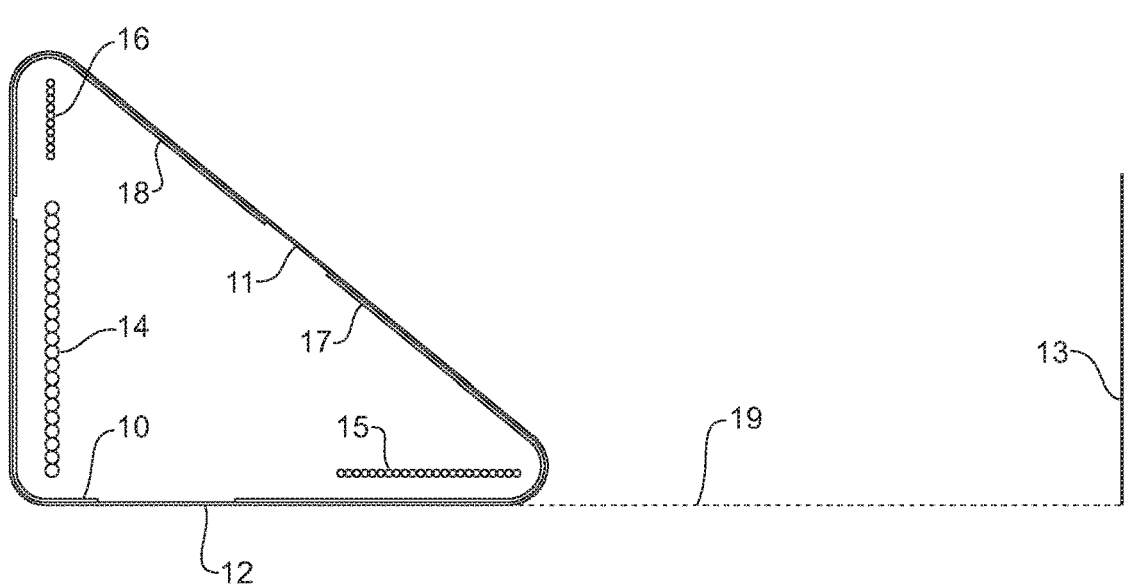
FIG. 2 shows an exemplary cross-section of a symmetrical circular NC coil of another embodiment of the disclosure.

FIG. 2 shows another exemplary embodiment of the present disclosure, and this example shows a half cross-sectional view of a circular coil, symmetrical about a central axis 13. (The full cross-section would include a right-hand side mirror image about the axis of symmetry 13.) The shape of the coil viewed from below or above for example is thus symmetrically circular. Not shown is any mechanical connection to a metal detector shaft for simplicity. This embodiment may encompass a suitable NC coil. FIG. 2 shows a coil housing 11, with a bottom plane 12 of the coil housing 11. A cross-section of the major transmit group of windings, in this example, just a single first transmit winding 14 shows a helical monolayer "straight" winding cross-section with its first axis orientated perpendicular to the bottom plane 12. The advantages for this orientation and monolayer winding are given above. A cross-section of the major group of receive windings, in this example a single first receive winding 15, is shown as an Archimedean spiral monolayer winding, and is parallel to the bottom plane 12 of the coil housing 11. Thus, the orientation of the longer cross-sectional third axis of the first receive winding is on average more parallel to the bottom plane 12 of the coil housing 11 than perpendicular to the bottom plane 12. Co-axial with the first transmit winding 14, is the minor group of receive windings, in this example just a single second receive winding 16, being a helical monolayer winding of the same mean radius as the first transmit winding. This second receive winding 16 is (deliberately) relatively far from the bottom plane 12 of the coil housing 11, so that the transmit field-to-soil-to-minor group of receive windings coupling is relatively weak. In order that the coil act as a NC coil, the sum of all the enclosed areas of all the turns of the aggregate receive windings, consisting of the first receive winding 15 is series with the second receive winding 16 connected in an out-of-phase sense, must be zero. Thus, if the first receive winding is a uniformly spread planar Archimedean spiral spanning between radii r=χ to δ (relative to the central axis 13) and has N turns, and the coaxial helical second receive winding 16 is of radius R has M turns, then $$\frac{N\int_\chi^\delta r^2 dr}{(\delta-\chi)} = \frac{N(\chi^2+\chi\delta+\delta^2)}{3} = MR^2$$

and $$\sqrt{\frac{(\chi^2+\chi\delta+\delta^2)}{3}}$$

is the effective mean radius of the windings of the first receive winding Archimedean spiral, from a magnetic field perspective. As above, the mean location of turns of the first receive winding, the major group of receive windings, is closer to a bottom plane of the coil housing than the mean location of turns of the aggregate transmit windings.

Note that it is possible simultaneously to create a null between the transmitted field and aggregate receive windings ($k_{TR}$<0.03), and also achieve a NC coil with this topology (with just three windings in total).

Similarly to FIG. 1, an ES screen 17 screens the first receive winding 15 and the ES screen 18 the second receive winding 16 from external EMI electric fields. ES screens 17 and 18 are connected to the metal detector electronics. Assuming the transmit winding 14 is connected to a relatively low impedance with respect to the electronics reference "ground", this too acts to partially ES screen second receive winding 16. There are advantages in having the ES screens 17 and 18 and the aggregate transmit winding relatively poorly capacitively coupled because any transients or high frequency voltage signals across the transmit winding may couple into the said screens and thence possibly to the receive windings via capacitance to the relatively poorly conducting ES screen. Hence, the shown gaps in the ES screens comprising ES screen 17 and ES screen 18, especially near the transmit winding. However, an independent different ES screen 10, also connected to the metal detector electronics via a different cable connection to that of ES screens 17 and 18, acts to screen electric fields from the transmit winding 14 from radiating outside of the coil housing 12.

The advantages of this NC coil arrangement shown in FIG. 2 relative to traditional NC coils are:
a) The transmit field will cause only low-level saturation (for reasons given above);
b) Both the major group of receive windings (the first receive winding 15) and the minor group of receive windings (the second receive winding 16) are relatively insensitive to any (low-level) transmit field saturation (owing to their relative distance from the transmit winding near the bottom plane 12 of the coil housing 11, namely, for the same reasons as for FIG. 1);
c) Because the transmit winding 14 is a monolayer, it transmits magnetic energy relatively well away from the windings into the environment compared to more compact cross-sectional windings;
d) Because the receive windings (15 and 16) are monolayers, these receive windings effectively have more "gain" than the more traditional bunched windings;
e) Relatively low sensitivity of near surface VRM inhomogeneities, for reasons as given above. However, in this instance, the major receive winding is well coupled to the surface soils in order to be relatively sensitive to shallow buried small metal targets which negates the capability of being relatively insensitive to near surface VRM inhomogeneities to some extent; and
f) Low transmit signal voltage transients capacitively coupling into the receive windings associated screens (17 and 18), for reasons given above.

Thus, for FIG. 2, at least the first receive winding 15 has at least part of its cross-sectional winding profile with a third cross-sectional axis longer than a fourth cross-sectional axis by at least a factor of 3. A mean location of turns of the minor group of receive windings is further from the bottom plane of the coil housing than the mean location of turns of the aggregate transmit windings, and both the mean path of turns of the aggregate transmit windings and the mean path of turns of the minor group of receive windings are closer to an outer perimeter of the coil housing than the mean path of turns of the major group of receive windings.

Figure 3:
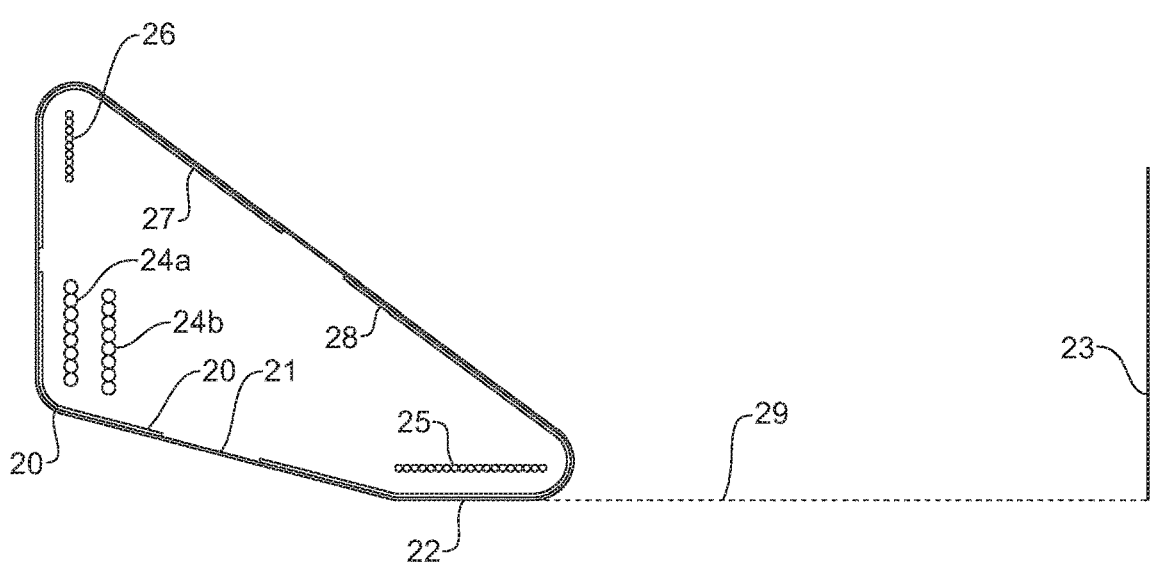
FIG. 3 shows an exemplary cross-section of a symmetrical circular NC coil with two transmit windings forming the major group of transmit windings of an embodiment of the disclosure.

Another embodiment similar to the principles described for FIG. 2 is shown in FIG. 3, but instead of the major group of transmit windings being a single layer "straight" monolayer 14, it is split into a group of two overlapping monolayer windings, a first transmit winding 24a, and another transmit winding 24b, both connected in series with the same sign sense. Transmit winding 24b is shown to be slightly closer to the bottom plane 22 of the coil housing 21, but this need not be so. The first receive winding 25 has the same function as the first receive winding 15 described for FIG. 2, and likewise the second receive winding 26 has the same function as the second receive winding 16 described for FIG. 2. Similarly, the role of the ES screens 27 and 28 is the same as that of ES screens 17 and 18, and also just like ES screen 10, ES screen 20 acts to screen electric fields from the transmit windings 24a and 24b from radiating outside of the coil housing 21, and this ES screen is also connected independently of ES screens 27 and 28 to the metal detector electronics. The axis of symmetry is shown as 23, and the geometric extension to the bottom plane 22 is 29. In both FIGS. 2 and 3, the mean location of the aggregate transmit windings (the first transmit winding 24a in series with third transmit winding 24b) are set substantially further from the bottom plane of the coil housing 22 than the first receive windings 25 or 15, so as to reduce saturation. The major group of receive windings comprises about two thirds of the aggregate receive windings' inductance. However, unlike FIG. 2 where the transmit winding 14 has its lowest conductor turn relatively close to the bottom plane of the coil housing 12, the lowest bottom conductor turns of both transmit windings 24a and 24b are designed to be set relatively not close to the bottom plane 22 of the coil housing 21, so as to reduce the peak magnetic field within surface soils near to the bottom plane 22 of the coil housing 21, and thus reducing saturation.

Figure 4:
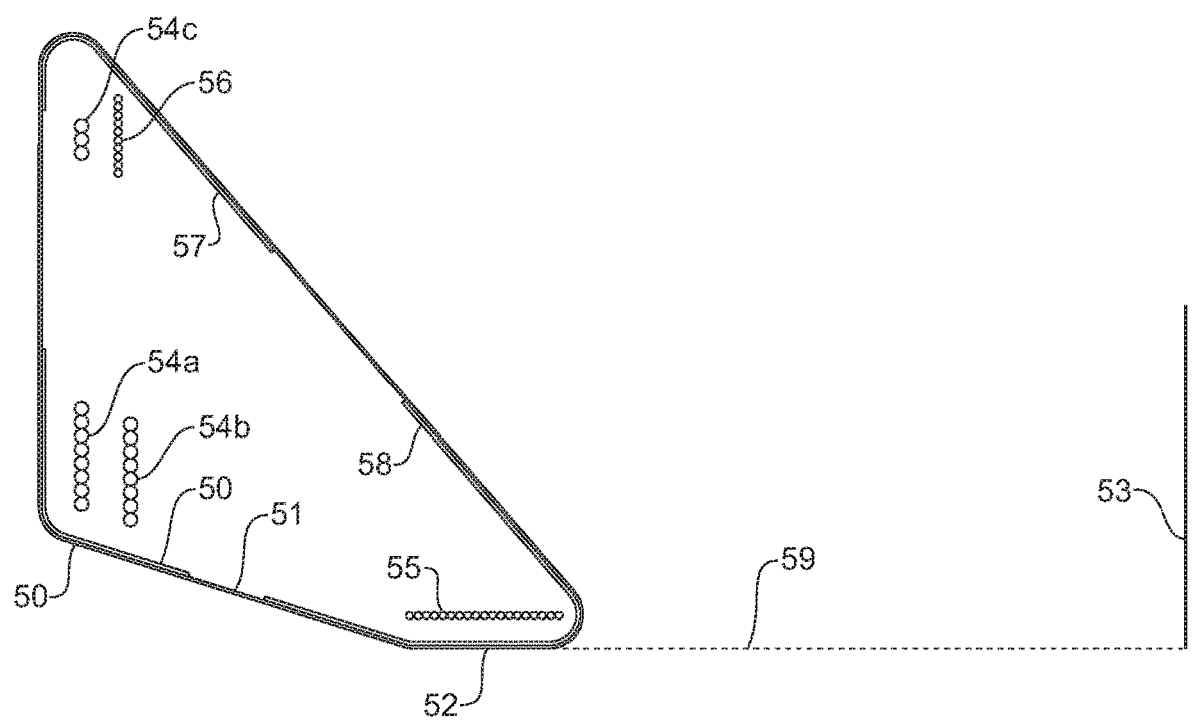
FIG. 4 shows an exemplary cross-section of a symmetrical circular NC coil similar to the embodiment of FIG. 3 but with an extra transmit winding within the major group of transmit windings that is tightly coupled to the minor group of receive windings.

FIG. 4 discloses a variation on the principles of FIG. 3; the only difference being that the aggregate transmit windings comprising just the major transmit group of windings, is split into a group of three windings, with a third transmit winding 54c added.

This added third transmit winding 54c is connected in series with first transmit winding 54b and transmit winding 54a, with all three transmit windings connected in the same sign sense. The third transmit winding 54c is relatively tightly coupled to the minor group of receive windings; the second receive winding 56, and the third transmit winding 54c has far fewer turns than the sum of the turns of the first transmit winding 54b and transmit winding 54a. Adding more turns to the third transmit winding 54c requires that the gap between the third transmit winding 54c plus the second receive winding 56, and, transmit windings 54a plus 54b needs to be increased, assuming all else remains unchanged, including the NC and nulling properties of the coil. At the asymptotic limit of this said increase gap, the inductance of the first receive winding 55 approaches the inductance of the second receive winding 56. However, if this gap becomes too large, the capability of this said coil for cancelling conductive ground signals and nearer field EMI is reduced. Thus, a reasonable maximum compromise is possibly somewhere around about that depicted, when the inductance of the first receive winding 55 is about 60% of the aggregate receive inductance.

Because the local mutual coupling coefficient k 32 between the third transmit winding 54c and the second receive winding 56 is relatively high, this requires that the gap between the second receive winding 56 and the first transmit winding 54b and transmit winding 54a is larger than the gap between the second receive winding 26 and the first transmit winding 24a and transmit winding 24b in FIG. 3; all else being equal. As the coils in FIGS. 2, 3 and 4 are NC types, this means that all cancel the received induced emf uniform changing magnetic fields, and thus, attenuate the fields from deep metal targets significantly too because their transmitted fields are relatively more uniform at the location of the coil than fields from shallow targets. Having a bigger gap between the first receive winding 55 and the second receive winding 56, thus reduces this deeper target attenuation, giving the arrangement of FIG. 4 an advantage in detecting deeper targets than FIG. 3, all else being equal. The coil central axes 13, 23 and 53, and ES screens 10, 17, 18, 20, 27, 28, 50, 57, 58 and coil housing bottom planes 12, 22, 52, with their geometric extensions 19, 29 and 59, and coil housings 11, 21, 51 are subject to the same descriptions as above.

Figure 5:
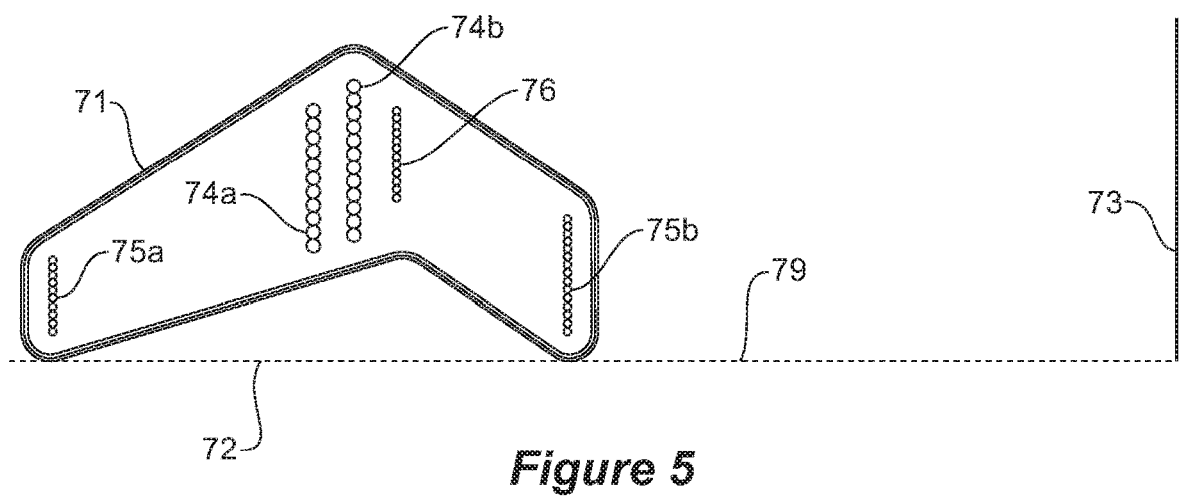
FIG. 5 shows an exemplary cross-section of a symmetrical circular coil with split windings within the major group of receive windings.

FIG. 5 shows another exemplary embodiment of the present disclosure with the major group of transmit windings as a split winding comprising winding 74a and winding 74b connected in series with the same phase sense (similar to FIG. 1 above), and the minor group of receive windings is a single second receive winding 76 tightly coupled to the major group of transmit windings (74a and 74b). However, unlike the above examples, the major group of receive windings is split into two windings; an outer receive winding, a first receive winding 75a that acts more to detect relatively deep targets than shallow, and, an inner receive winding, a third receive winding 75b that acts more to detect relatively shallow buried targets than deep. The first receive winding 75a and the third receive winding 75b are connected in series in the same sign sense, but this major group of receive windings (75a and 75b) are connected series connected to the minor group of receive windings, namely a second receive winding 76, in an out-of-phase sense. The bottom plane of the coil housing is indicated by 72, and its geometric extension to the right-hand mirror image is indicated by 79. Not shown are the ES screens that may be implemented using the principles described above. This is not an NC coil, but as in all the examples above, a nulled coil. Receive winding 75b may alternatively be flat wound, or of a shape like FIG. 6. For this type of coil, a useful arrangement may be that the major group of receive windings comprising a first receive winding (75a) in series with a third receive winding (75b), such that a mean path of turns of the first receive winding (75a) is longer than a mean path of turns of the aggregate transmit windings (74a and 74b) by at least a factor of 1.25 times, and a mean path of turns of the aggregate transmit windings (74a and 74b) is longer than a mean path of turns of the third receive winding (75b) by at least a factor of 1.25 times, and a mutual coupling coefficient between the aggregate transmit windings (74a and 74b) and each of the first receive winding (75a) and the third receive winding (75b) is k<0.5, and a mutual coupling coefficient between the aggregate transmit windings (74a and 74b) and the minor group of receive windings (76) is greater than a mutual coupling coefficient between the aggregate transmit windings (74a and 74b) and the major group of receive windings (75a and 75b). The advantages of this coil arrangement are given below. For this type of coil, a mean location of turns of the major group of receive windings, is closer to a bottom plane of the coil housing than the mean location of turns of the aggregate transmit windings; the "lowest" part of the major group of receive windings determining a reasonable location of the bottom plane 72 for a coil housing 71 (e.g. 7 mm below).

Figure 6:
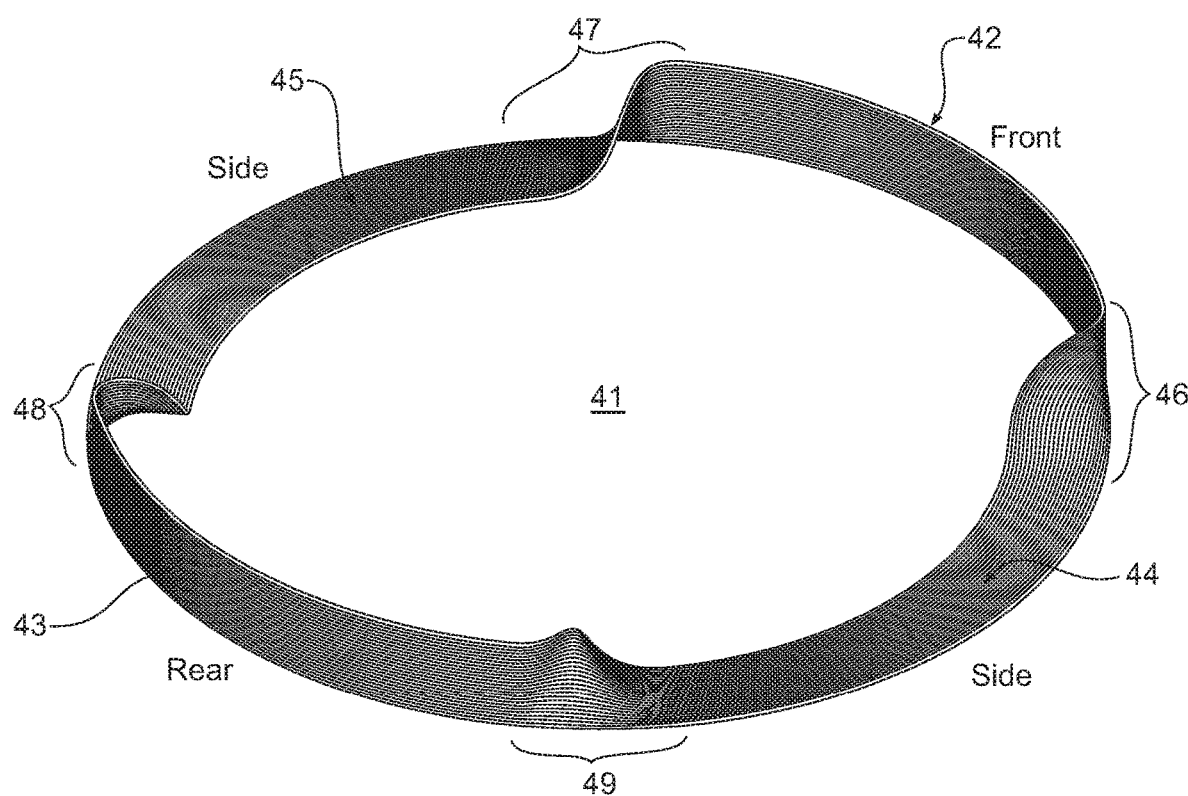
FIG. 6 shows an exemplary alternative winding within the major group of receive windings that will reduce spurious signals generated by some soil components.

FIG. 6 shows an improvement to a flat-wound receive winding, for example, the first receive windings 15, 25 and 55 respectively in FIGS. 2, 3 and 4. FIG. 6 shows the said receive winding 41 with a first section 44 section with a cross-sectional monolayer axis parallel to the bottom plane of the coil housing (not shown) along the (right) side of the receive winding 41, and a mirror image third section 45 with a cross-sectional monolayer axis also parallel to the bottom plane of the coil housing along the (left) side. Further, the receive winding 41 has a second section 42 along the front of the receive winding 41 with a cross-sectional monolayer axis perpendicular to the bottom plane of the coil housing, and a mirror image fourth section 43 with a cross-sectional monolayer axis also perpendicular to the bottom plane of the coil housing along the rear of the receive winding 41.

Herein the said sides of the coil are defined as being perpendicular to the intended operational side-to side sweeping over the soil, and the said front being the leading edge of the intended operational more gradual forward movement, and the said rear being the trailing edge of the intended operational more gradual forward movement. The monolayer cross-sectional angle changes rapidly in the transitions between the said sections. This is an improvement due to the sides being well coupled to the soil, and hence relatively sensitive to buried targets in near surface soils, but this also means being simultaneously sensitive to soil VRM anomalies which increase un-ground-balanced VRM spurious signals as is the case for the first windings 15, 25 and 55 over the whole length of their windings. However, the front and rear of the receive winding 41 are not as sensitive to the soil's near surface, because of these winding sections being further from the coil's bottom plane, thus reducing the very near field sensitivity to anomalous VRM soil components. For deeper targets though, the receive winding 41 is only slightly less sensitive than the flat-wound first windings 15, 25 and 55 because of the increased distance from the rear and end sections of the winding. Thus, overall, this improved receive winding 41 may produce fewer spurious signals from VRM anomalies at the expense of only slightly lower sensitivity to deeper targets, whilst maintaining high sensitivity to shallow buried targets, because, as the coil is mainly swept side, it is more likely that a shallow target will pass below the sides 45 and 44 of the receive winding 41 than beneath the front section 42 or rear section 43.

In order to calculate the relative on-axis sensitivity versus depth of coaxial windings for a given coil windings arrangement, each winding may be considered as a transmitter with the same arbitrary current in each winding. Then the net on-axis field from the receive windings acting as a transmitter is multiplied by the net transmitted field of the transmit winding, to get the said relative value. For example, consider the uniformly wound symmetric coaxial windings arrangements of FIG. 2. These comprise both "vertical" uniformly wound solenoid helixes and Archimedean spirals. For a particular given vertical monolayer uniformly wound helical solenoid with (vertical) width $\beta$ (spanning between the centre of the bottom turn conductor to the centre of the top turn conductor), of N turns and of radius R, the on-axis transmitted field from that said winding for the said given arbitrary current at z=$\alpha$ with a coaxial z axis having z=0 at a plane perpendicular to the z axis passing through the centre of lowest conductor turn of the said vertical helical solenoid winding, where z is positive below the bottom plane of the coil housing, is $$B \propto \frac{NR^2}{\beta} \int_{\alpha}^{\alpha+\beta} \frac{dz}{(z^2+R^2)^{1.5}} = \frac{N}{\beta}\left\{\frac{\alpha+\beta}{\sqrt{(\alpha+\beta)^2+R^2}} - \frac{\alpha}{\sqrt{\alpha^2+R^2}}\right\}$$

Similarly, for "horizontal" radially uniformly wound Archimedean spiral winding, with radius R spanning $\chi$ to $\delta$, the on-axis field at z due to the said same arbitrary current is:

$$B \propto \frac{N}{\delta-\chi} \int_{\chi}^{\delta} \frac{R^2 dR}{(z^2+R^2)^{1.5}} =$$

$$\frac{N}{\delta-\chi}\left\{\ln\left(\frac{\delta+\sqrt{z^2+\delta^2}}{\chi+\sqrt{z^2+\chi^2}}\right) - \frac{\delta}{\sqrt{z^2+\delta^2}} + \frac{\chi}{\sqrt{z^2+\chi^2}}\right\}$$

Table 1 lists examples for possible winding dimensions (in millimetres) for the indicated FIGS. 1, 3, 4, 5, where in this instance, z=0 is defined as being the lowest centre of lowest turn of a receive winding, closest to the bottom plane of the coils. Assume the bottom plane of the coil housing may be several mm below this, for example 7 mm Note that as required above for a "NC" coil example of FIG. 3 values, $$\frac{22(\chi^2+\chi\delta+\delta^2)}{3} = 9*208.3^2.$$

The table has (-) signs for windings of the minor groups, to indicate that the phase of the winding is in an opposite sign sense (so as to effect a "null" between the transmit field and net receive winding induced emf). Note that the outer most winding for the all above values may be suitable for a coil housing diameter of about 17". Further, that for FIG. 3 and FIG. 4, both the mean path of turns of the aggregate transmit windings and the mean path of turns of the minor group of receive windings are each closer to an outer perimeter of the coil housing than the mean path of turns of the major group of receive windings by a factor of more than 1.3 times.

TABLE 1

|  | α | β | χ (or R) | δ | N |
|---|---|---|---|---|---|
| FIG. 1 | | | | | |
| Transmit winding 4a | 14.7 | 37.2 | 153.1 | | 11 |
| Transmit winding 4b | 15.5 | 40.2 | 146.1 | | 12 |
| Receive winding 5 | 0 | 21.1 | 208.7 | | 17 |
| Receive winding 6 | 21.9 | 33.8 | 144.9 | | (−)10 |
| FIG. 3 (NC coil) | | | | | |
| Transmit winding 24a | 11.8 | 29.8 | 208.3 | | 9 |
| Transmit winding 24b | 10.5 | 28.5 | 201.3 | | 9 |
| Receive winding 25 | 0 | | 119.1 | 146.8 | 22 |
| Receive winding 26 | 48.9 | 59.5 | 208.3 | | (−)9 |
| FIG. 4 (NC coil) | | | | | |
| Transmit winding 54a | 18.5 | 35 | 208.2 | | 8 |
| Transmit winding 54b | 16.2 | 32.6 | 201.2 | | 8 |
| Transmit winding 54c | 77.1 | 81.8 | 208.2 | | 3 |
| Receive winding 55 | 0 | | 129.2 | 154.7 | 20 |
| Receive winding 56 | 73.5 | 85.4 | 201.2 | | (−)10 |
| FIG. 5 | | | | | |
| Transmit winding 74a | 15.7 | 42.7 | 161.9 | | 11 |
| Transmit winding 74b | 17.9 | 47.6 | 154.5 | | 12 |
| Receive winding 75a | 0 | 13.2 | 208.7 | | 11 |
| Receive winding 75b | 0 | 21.1 | 114.3 | | 17 |
| Receive winding 76 | 24.2 | 41.4 | 147.0 | | (−)14 |
| Embodiment X | | | | | |
| Major transmit 1 | 16.6 | 46.3 | 146.1 | | 12 |
| Major transmit 2 | 14.8 | 44.5 | 153.5 | | 12 |
| Major receive 1 | 0 | 9.24 | 208.7 | | 8 |
| Major receive 2 | 1.8 | 11.9 | 103.6 | | 9 |
| Minor receive | 25.5 | 37.4 | 144.51 | | (−)10 |

The Embodiment X listed in Table 1 has a "split" major group of receive windings, consisting of "major receive 1" and "major receive 2", that are connected in series in the same phase sense, and both are orientated perpendicularly to a bottom plane of a coil housing, and offset radially one from the other as indicated. Its major group of transmit windings is also "split" into two, consisting of "major transmit 1" and "major transmit 2", that are connected in series in the same phase sense, and both are orientated perpendicularly to a bottom plane of a coil housing, and offset radially one from the other as indicated. The minor group of receive windings consists of a single winding that is close to the major group of transmit windings, and of smaller radius and in an area where the transmitted field is relatively high for the purpose of attaining relatively high mutual coupling coefficient to the major group of transmit windings. The performance of this coil is slightly better than that of FIG. 1.

Another useful calculation as above, but for a "tilted straight" winding at θ radians to the bottom plane of the coil housing, with the winding end furthest from the said bottom plane having a radius of χ, and the winding end closest to the bottom plane having a radius δ, where $$0 < \theta < \frac{\pi}{2} \text{ for } \chi < \delta$$

$$\left(\text{and } \frac{\pi}{2} < \theta < \pi \text{ for } \chi > \delta\right),$$

is $$B \propto \frac{N}{\delta - \chi} \int_\chi^\delta \frac{R^2 dR}{\{\Lambda R^2 - 2\psi\tan(\theta)R + \psi^2\}^{1.5}} =$$

$$\frac{N}{\Lambda(\delta - \chi)} \left[\frac{1}{\sqrt{\Lambda}} \ln\left(\frac{\left[\Lambda\delta + \sqrt{\Lambda(\delta^2 + z^2)}\right]/\psi - \tan(\theta)}{\left[\Lambda\chi + \sqrt{\Lambda(\Lambda\chi^2 - 2\psi\tan(\theta)\chi + \psi^2)}\right]/\psi - \tan(\theta)}\right) + \frac{[1 - \tan^2(\theta)]\chi + \psi\tan(\theta)}{\sqrt{\Lambda\chi^2 - 2\psi\tan(\theta)\chi + \psi^2}} - \frac{\delta + z\tan(\theta)}{\sqrt{\delta^2 + z^2}}\right]$$

where $\Lambda = 1 + \tan^2(\theta)$, and $\psi = z + \delta\tan(\theta)$.

Figure 7:
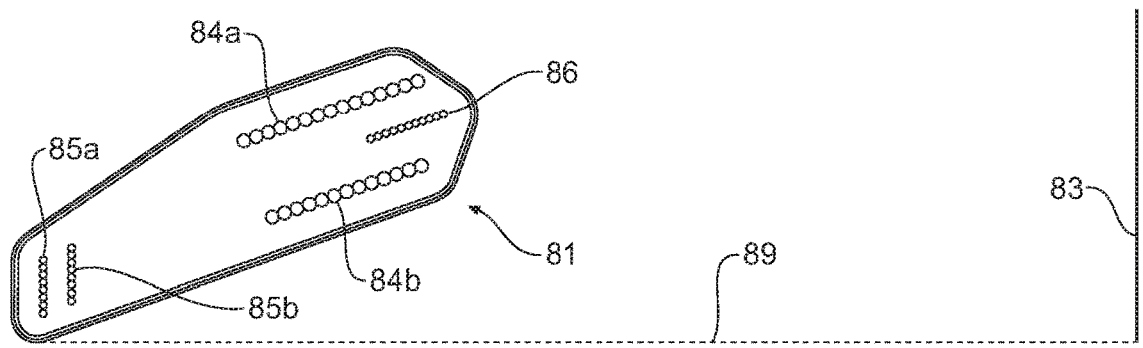
FIG. 7 shows an exemplary cross-section of a symmetrical coil of an embodiment of the disclosure.

FIG. 7 shows cross-section of an exemplary circular coil, with a major group of "straight" transmit windings that are "tilted" relative to a bottom plane of a coil housing, consisting of two windings, 84A and 84B, both parallel to each other, that are connected in series in the same phase sense. Between them is a minor group of receive windings 86, consisting of a single winding parallel to the two transmit windings. The major group of receive windings consists of two receive windings, 85A and 85B, connected in series in the same phase sense, with both orientated vertically and radially offset relative to a bottom plane 89 of the coil housing 81, projected as 89, that passes through the coil's central axis 83, and is coincident with a "bottom-most" section of the coil housing 81. The major group of receive windings 85A, 85B are connected in series with the minor group of receive windings 86 in an out-of-phase sense. Not shown in FIG. 7 are the ES screens for reasons of simplicity. These may occupy areas consistent with the principles described above.

Table 2 lists example dimensions for a possible coil shown in FIG. 7, where θ=20°.

TABLE 2

| FIG. 7 | α | β | χ (or R) | δ | N |
|---|---|---|---|---|---|
| Transmit winding 84a | 32.51 | | 142.97 | 173.43 | 12 |
| Transmit winding 84b | 17.45 | | 138.13 | 166.05 | 12 |
| Receive winding 85a | 0 | 9.24 | 208.7 | | 8 |
| Receive Winding 85b | 1.96 | 11.2 | 203.4 | | 8 |
| Receive winding 86 | 32.74 | | 131.69 | 144.09 | (−)11 |

The percentage difference in relative gain between the coil of FIG. 7 and the "embodiment X" in Table 1 calculated at 1 metre on axis is only 0.9%, and at 500 mm, about 1.4%.

Table 3 lists the mean the mean location of turns of the major group of transmit windings to the bottom plane of the coil housings, and the mean location of turns of the minor group of receive windings for the indicated figures, assuming that the bottom plane of the coil housing is about 7 mm below the lowest receive winding conductor's centre. For example, the bottom plane may typically be thought of as the bottom-most section of the coil's plastic housing.

TABLE 3

| Coil | Mean major transmit to bottom plane | Mean minor receive to bottom plane |
|---|---|---|
| FIG. 1 | 33.9 | 34.9 |
| FIG. 3 | 27.2 | 61.2 |
| FIG. 4 | 32.6 | 86.5 |
| FIG. 5 | 38.1 | 39.8 |
| Embodiment X (Table 1) | 37.6 | 37.8 |
| FIG. 7 | 42.7 | 48.0 |

Table 4 indicates approximate mutual coupling coefficients between the indicated windings listed in table 1 and also receive winding group inductances. In this table, the second column lists the mutual coupling coefficient between the major group of transmit windings and the major group of receive windings, and the third column lists the mutual coupling coefficient between the major group of transmit windings and the minor group of receive windings. The fourth column tables the inductances in µH of the major group of receive windings, while the fifth column, the ratio of inductances between the major and minor groups of receive windings. For the FIG. 5 example values in table 1, the mutual inductance coupling coefficients between the aggregate transmit windings (74a and 74b) and the first receive winding 75a is $k_{T1}=0.37$, and the mutual inductance coupling coefficients between the aggregate transmit windings (74a and 74b) and the third receive winding 75b is $k_{T1}=0.38$.

TABLE 4

| | Mutual coupling coefficients | | | |
|---|---|---|---|---|
| FIG. | Major transmit winding to major receive winding, $k_{T1}$ | Major transmit winding to minor receive winding, $k_{T2}$ | Major receiving winding inductance | Ratio of major receive winding inductance to minor receive winding inductance |
| 1 | 0.35 | 0.73 | 289 | 4.2 |
| 3 | 0.29 | 0.48 | 251 | 2.7 |
| 5 | 0.49 | 0.76 | 320 | 2.4 |

Table 4 affirms the relationship between the major group of transmit windings and the major group of receive windings versus the minor group of receive windings described above.

At the time of writing, Litz wire may be the choice of wire in making coils described in this Specification. The net Litz wire conducive cross-sectional area is chosen to produce a desired coil resistance. As an example, the inductance of a transmit winding may be in the vicinity of 300 µE, and DC resistance in the region of 0.312, and similarly a net inductance of the aggregate receive windings may be in the vicinity of 300 µE.

Figure 8A:
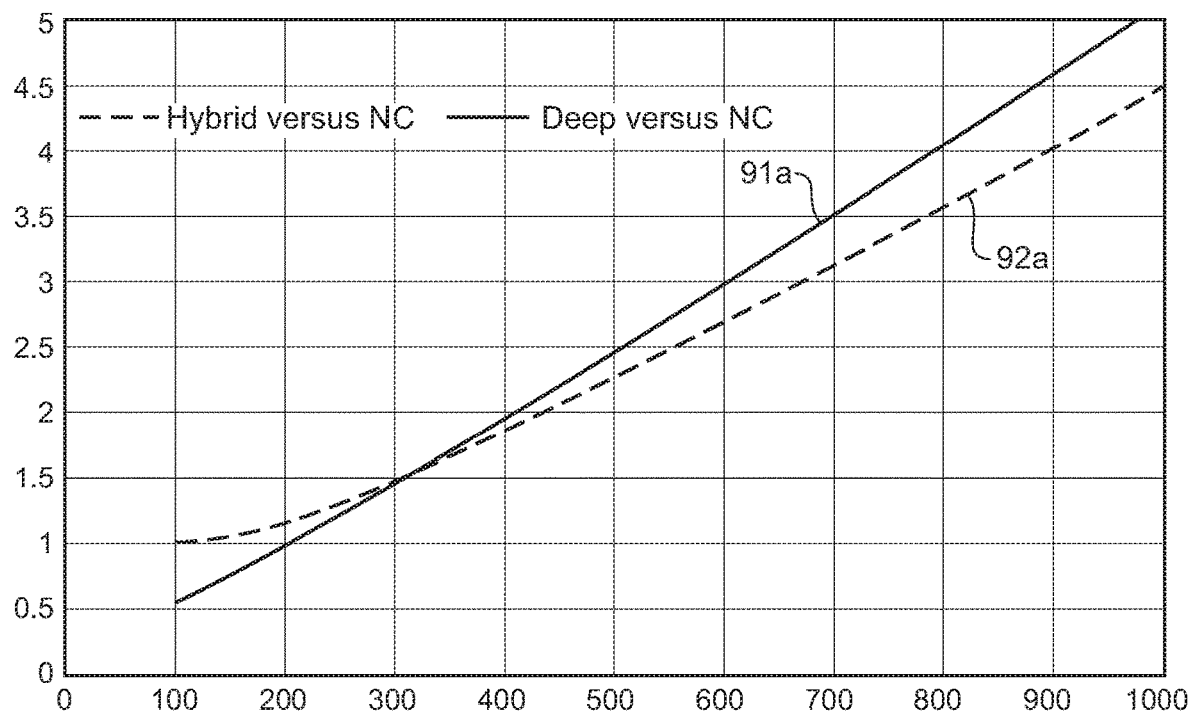
FIGS. 8A, 8B, 8C, and 8D show graphs of the ratio of on-axis relative gain versus distance from a bottom plane for the coils for the indicated example dimensions in table 1.
Figure 8B:
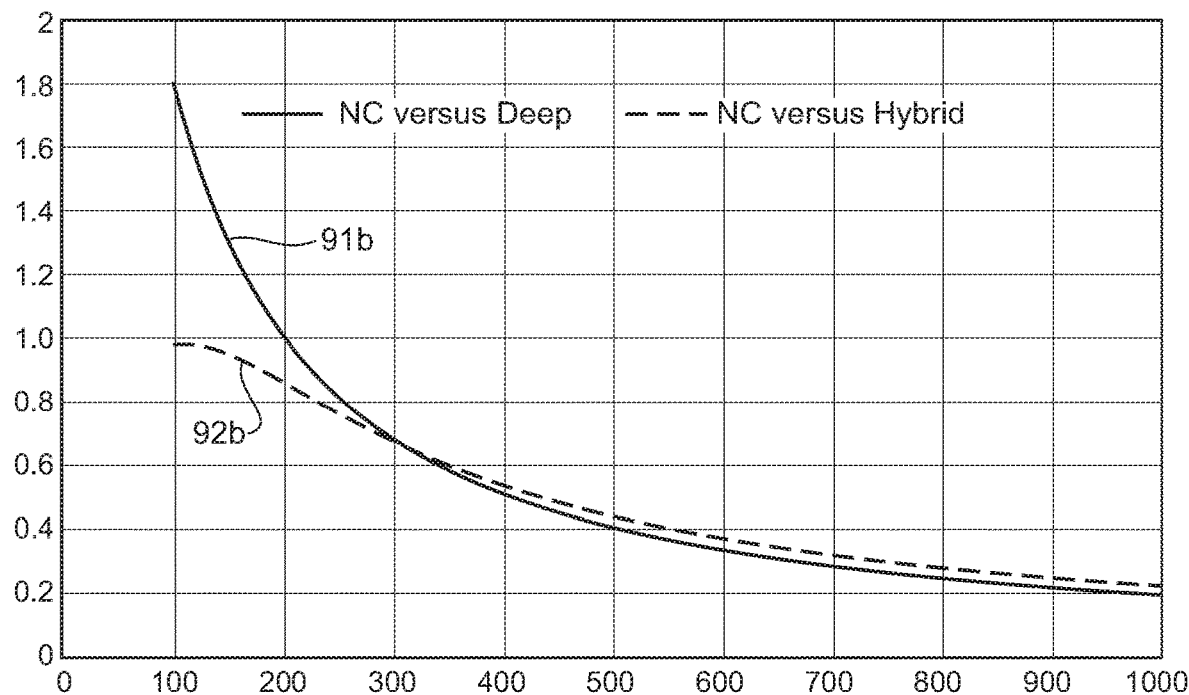
Figure 8C:
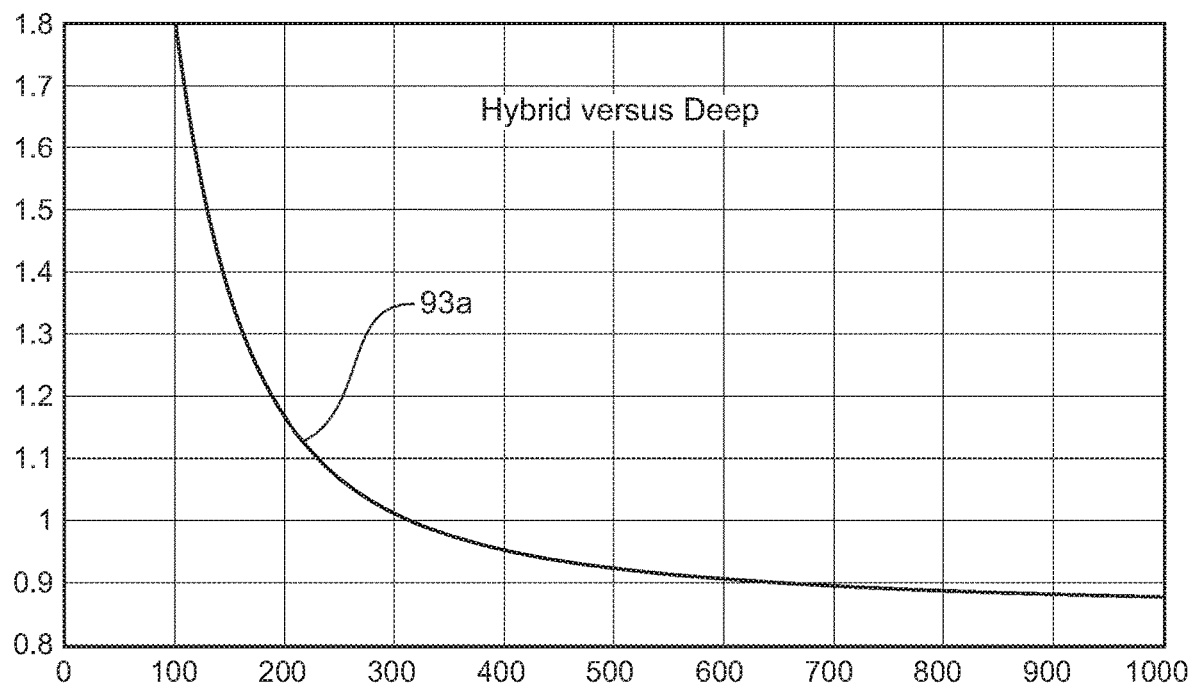
Figure 8D:
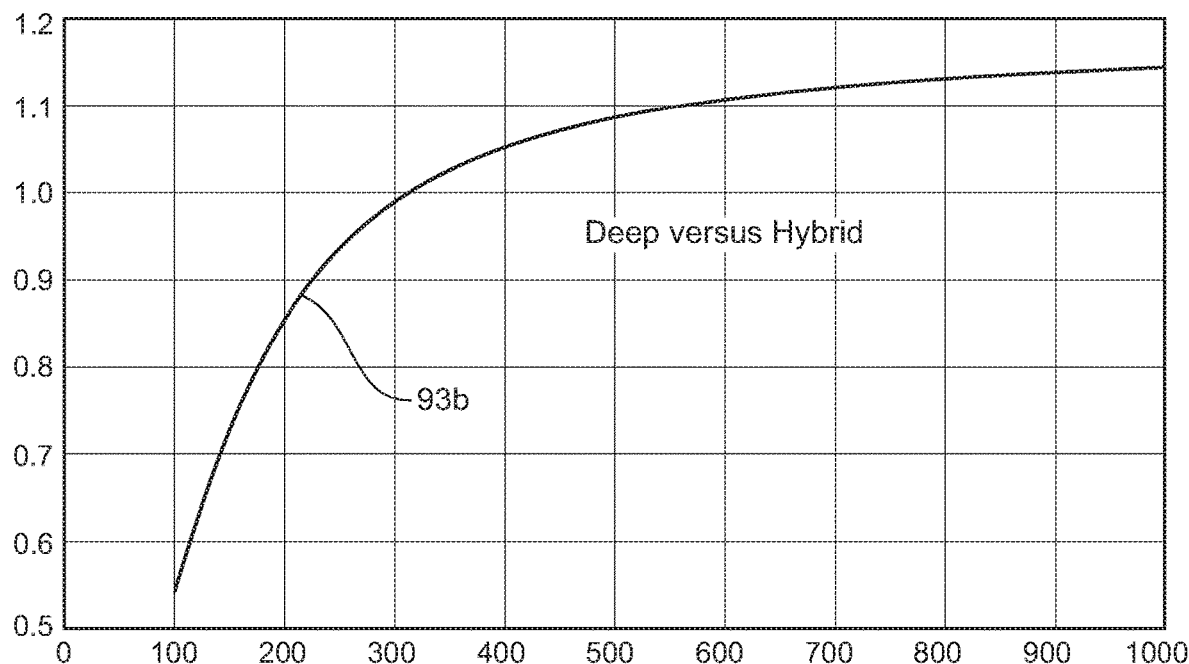

The graphs in FIGS. 8A, 8B, 8C, and 8D show the ratio in on-axis relative gain versus on-axis distance z(mm) below the coil's housing bottom plane, with z=0 set arbitrarily at 7 mm below the centre of the lowest turn conductor of the lowest receive winding to represent the coil housing's bottom plane for:

$$\frac{\text{FIG. 1 values}}{\text{FIG. 3 values}} 91a, \text{ and } \frac{\text{FIG. 5 values}}{\text{FIG. 3 values}} 92a; \quad \text{FIG. 8a}$$

$$\frac{\text{FIG. 3 values}}{\text{FIG. 1 values}} 91b, \text{ and } \frac{\text{FIG. 3 values}}{\text{FIG. 5 values}} 92b; \quad \text{FIG. 8b}$$

$$\frac{\text{FIG. 5 values}}{\text{FIG. 1 values}} 93a; \text{ and} \quad \text{FIG. 8c}$$

$$\frac{\text{FIG. 1 values}}{\text{FIG. 5 values}} 93b. \quad \text{FIG. 8d}$$

FIGS. 8A, 8B, 8C, and 8D confirm the various attributes of the topologies of the winding geometries compared in the graphs, namely; the example values for FIG. 1 indicate a coil fit-for-purpose suited for locating deeper targets but less capable than those for FIGS. 3 and 5 for detecting shallower targets, and the example values for FIG. 5 indicate a coil fit-for-purpose suited for locating both deeper and shallower targets simultaneously (but not quite as capable as FIG. 1 for the deeper targets).

Whilst the example values for FIG. 3 may appear to be consistently worse for z>100 mm compared to the example values for FIG. 5, the FIG. 3 coil nevertheless does have the advantage of being an NC coil that is thus relatively immune to EMI and conductive soil components. Note that the cross-over points between the coil topologies is about z=310 mm between the example values for FIG. 1 and FIG. 5, and about 200 mm between the example values for FIG. 1 and FIG. 3.

Note these graph examples are only for on axis comparisons, not off-axis where the maximum sensitivity for very shallow targets occurs closer to some windings than on-axis sensitivity. Hence the graphs start at z=100 mm and do not show ratios below z=100 mm. The values for FIG. 8B are merely the reciprocals of FIG. 8a for convenience of understanding, and similarly between FIGS. 8C and 8D.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the disclosure is not restricted in its use to the particular application described. Neither is the present disclosure restricted in its preferred embodiment with regard to the particular elements and/or features described or depicted herein. It will be appreciated that the disclosure is not limited to the embodiment or embodiments disclosed, but is capable of numerous rearrangements, modifications and substitutions without departing from the scope of the disclosure as set forth and defined by the following claims.

The invention claimed is:

1. A hand-held metal detector coil, comprising a coil housing which houses aggregate transmit windings and aggregate receive windings;
   wherein the aggregate transmit windings comprise a major group of transmit windings that comprises a first transmit winding, and the aggregate receive windings comprise a major group of receive windings that comprises a first receive winding;
   the coil further comprises a minor group of windings to null the aggregate receive windings with respect to the aggregate transmit windings, wherein in an absence of external influences, a mutual inductance coupling coefficient between the aggregate receive windings and the aggregate transmit windings, $k_{TR}$, is <0.03;
   and wherein a mean location of turns of the major group of transmit windings is further from a bottom plane of the coil housing than a mean location of turns of the major group of receive windings;
   the first transmit winding has at least part of their cross-sectional winding profile with a first cross-sectional axis longer than a second cross-sectional axis by at least a factor of 3;
   a mutual coupling constant coefficient between the major group of transmit windings and the major group of receive windings, $k_{11}$, is <0.5; and
   a mean location of turns of the of the first transmit winding is at least 25 mm or more from a bottom plane of the coil housing.

2. The hand-held metal detector coil of claim 1, wherein the aggregate receive windings comprises a minor group of receive windings that comprises a second receive winding; and wherein the major group of receive windings and the minor group of receive windings are connected out-of-phase relative to each other; and a mutual coupling constant coefficient between the major group of transmit windings and the minor group of receive windings, $k_{12}$, is >0.4, and a mutual coupling coefficient between the major group of transmit windings and the minor group of receive windings, $k_{12}$, is greater than a mutual coupling coefficient between the major group of transmit windings and major group of receive windings, $k_{11}$; and an inductance of the major group of receive windings is greater than an inductance of the minor group of receive windings; and a mean location of turns of the minor group of receive windings is further from the bottom plane of the coil housing than the mean location of turns of the major group of receive windings.

3. The hand-held metal detector coil of claim 2, wherein the first receive winding has at least part of its cross-sectional winding profile with a third cross-sectional axis longer than a fourth cross-sectional axis by at least a factor of 3.

4. The hand-held metal detector coil of claim 3, wherein a mean location of turns of the minor group of receive windings is further from the bottom plane of the coil housing than the mean location of turns of the aggregate transmit windings, and both a mean path of turns of the aggregate transmit windings and a mean path of turns of the minor group of receive windings are each closer to an outer perimeter of the coil housing than a mean path of turns of the major group of receive windings.

5. The hand-held metal detector coil of claim 4, wherein both the mean path of turns of the aggregate transmit windings and the mean path of turns of the minor group of receive windings are each closer to an outer perimeter of the coil housing than the mean path of turns of the major group of receive windings by a factor of more than 1.3 times.

6. The hand-held metal detector coil of claim 4, wherein the aggregate receive windings null out a changing uniform magnetic field as follows:

$$\sum_{\text{all receive windings}} \oiint \frac{\partial \overrightarrow{B_{\text{uniform field}}}}{\partial t} \cdot d\vec{s} \approx 0.$$

7. The hand-held metal detector coil of claim 4, wherein the first cross-sectional axis of the first transmit winding is on average more perpendicular than parallel to a bottom plane of the coil housing.

8. The hand-held metal detector coil of claim 4; wherein the aggregate transmit windings comprises a third transmit winding, and the aggregate transmit windings has a mean path of turns with a longer perimeter than the major group of receive windings, and the third transmit winding has a mean location with a longer perimeter than the minor group of receive windings, and the mutual inductance coupling coefficient between the minor group of receive windings and the third transmit winding $k_{32}>0.7$, and a mean location of turns of the minor group of receive windings is further from the bottom plane than the mean location of turns of the aggregate transmit windings, and a mean location of turns of the third transmit winding is further from the bottom plane than the mean location of turns of the aggregate transmit windings, and the third transmit winding is in series with the first transmit winding with the same sign sense.

9. The hand-held metal detector coil of claim 3, wherein the first receive winding has at least a first section with the third cross-sectional axis more parallel than perpendicular to the bottom plane of the coil housing on a side of the first receive winding that is relatively on the same side as at least one of the sides of the coil housing, and, the first receive winding has at least a second section with the third cross-sectional axis more perpendicular than parallel to the bottom plane of the coil housing on a side of the first receive winding that is relatively on the same side as at least one of a front or a rear of the coil housing, the said sides of the coil housing being perpendicular to the intended operational side-to side sweeping over the soil, and the said front of the coil housing being the leading edge of the intended operational gradual forward movement, and the said rear of the coil housing being the trailing edge of the intended operational gradual forward movement.

10. The hand-held metal detector coil of claim 2, wherein the transmit aggregate windings and the second receive winding has a mutual inductance coupling coefficient $k_{T2}>0.7$, and the aggregate transmit windings has a mean path of turns with a longer perimeter than a mean path of turns of the minor group of receive windings, and the major group of receive windings has a mean path of turns with a longer perimeter than a mean path of turns the aggregate transmit windings, and the mutual inductance coupling coefficient between the major group of receive windings and the aggregate transmit windings $k_{T1}<0.5$, and the first receive winding has at least part of its cross-sectional winding profile with a third cross-sectional axis longer than a fourth cross-sectional axis by at least a factor of 3, with the third cross-sectional axis on average being more perpendicular than parallel to a bottom plane of the coil housing than the fourth axis.

11. The hand-held metal detector coil of claim 2, wherein the major group of receive windings comprises a first receive winding in series with a third receive winding, such that a mean path of turns of the first receive winding is longer than a mean path of turns of the aggregate transmit windings by at least a factor of 1.25 times, and a mean path of turns of the aggregate transmit windings is longer than a mean path of turns of the third receive winding by at least a factor of 1.25 times, and a mutual coupling coefficient between the aggregate transmit windings and each of the first receive winding and the third receive winding is k<0.5, and a mutual coupling coefficient between the aggregate transmit windings and the minor group of receive windings is greater than a mutual coupling coefficient between the aggregate transmit windings and the major group of receive windings, and a mean location of turns of the third receive winding is closer to the bottom plane of the coil housing than a mean location of turns of the aggregate transmit windings, and a mean location of turns of the third receive winding is closer to the bottom plane of the coil housing than the mean location of turns of the minor group of receive windings.

12. The hand-held metal detector coil of claim 1, wherein the aggregate transmit windings comprises the minor group as a minor group of transmit windings, that comprises a second transmit winding; and wherein the major group of transmit windings and the minor group of transmit windings are connected out-of-phase relative to reach other; a mutual coupling constant coefficient between the major group of receive windings and the minor group of transmit windings, $k_{21}$, is >0.4, and a mutual coupling coefficient between the major group of transmit windings and the major group of receive windings, $k_{11}$, is less than a mutual coupling coefficient between the minor group of transmit windings and the major group of receive windings, $k_{21}$; and an inductance of the major group of transmit windings is greater than an inductance of the minor group of transmit windings; and a mean location of turns of both the minor group of transmit windings and the major group of transmit windings are each further from the bottom plane of the coil housing than the mean location of turns of the major group of receive windings.

13. The hand-held metal detector coil of claim 12, wherein the aggregate transmit windings has a mean path of turns with a longer perimeter than a mean path of turns of the aggregate receive windings, and the aggregate receive windings has a mean path of turns with a longer perimeter that the minor group of transmit windings, and the mutual inductance coupling coefficient between the aggregate receive windings and the minor group of transmit windings is $k_{2R}>0.7$, and the mutual inductance coupling coefficient between the major group of receive windings and the major group of transmit windings $k_{11}<0.5$.

14. The hand-held metal detector coil of claim 1, wherein the aggregate transmit windings comprises at least two transmit windings, the first transmit winding, and a fourth transmit winding, wherein the first transmit winding and the fourth transmit winding are connected in series with the same sign sense.

15. The hand-held metal detector coil of claim 1, wherein at least part of the major group of transmit windings comprises at least the first transmit winding and a fifth transmit winding, wherein the first transmit winding and a fifth transmit winding geometrically partial overlap, wherein the at least partial overlap has a displacement between some windings of the first transmit winding and some windings of the fifth transmit winding, wherein the displacement is relatively parallel to the bottom plane of the coil housing, wherein the first transmit winding and the fifth transmit winding are connected in series with the same sign sense.

* * * * *

UNITED STATES PATENT AND TRADEMARK OFFICE
CERTIFICATE OF CORRECTION

| | | |
|---|---|---|
| PATENT NO. | : 12,429,620 B2 | Page 1 of 1 |
| APPLICATION NO. | : 18/266962 | |
| DATED | : September 30, 2025 | |
| INVENTOR(S) | : Bruce Halcro Candy | |

It is certified that error appears in the above-identified patent and that said Letters Patent is hereby corrected as shown below:

On the Title Page (57), Column 2, Abstract, Line 21, after "turns" delete "of the"

In the Claims

Column 24, Line 35, Claim 1, delete "of the or the" and insert -- or the --

Column 25, Line 22, Claim 8, delete "4;" and insert -- 4 --

Signed and Sealed this
Twenty-third Day of December, 2025

John A. Squires
*Director of the United States Patent and Trademark Office*